United States Patent Office 2,760,834
Patented Aug. 28, 1956

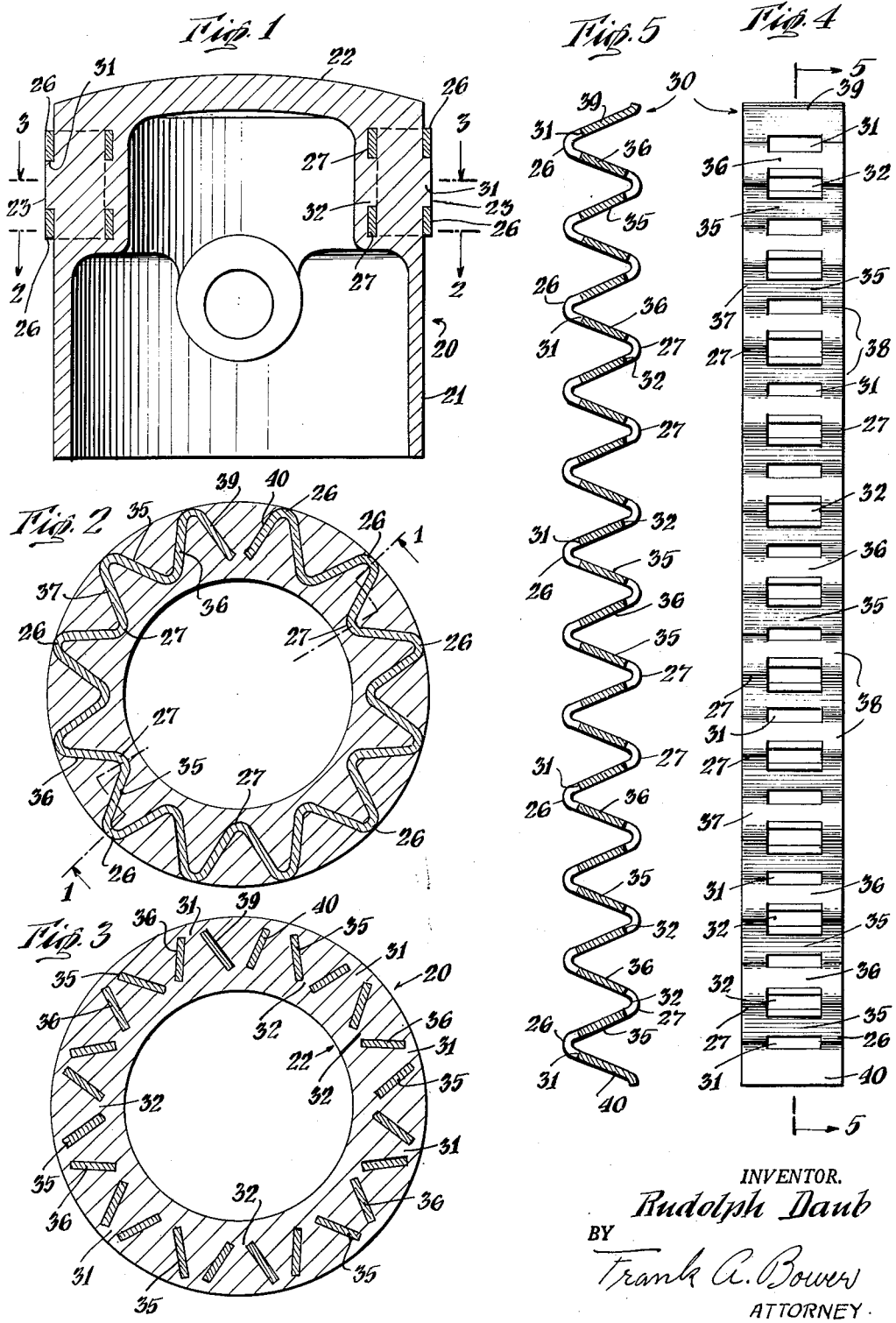

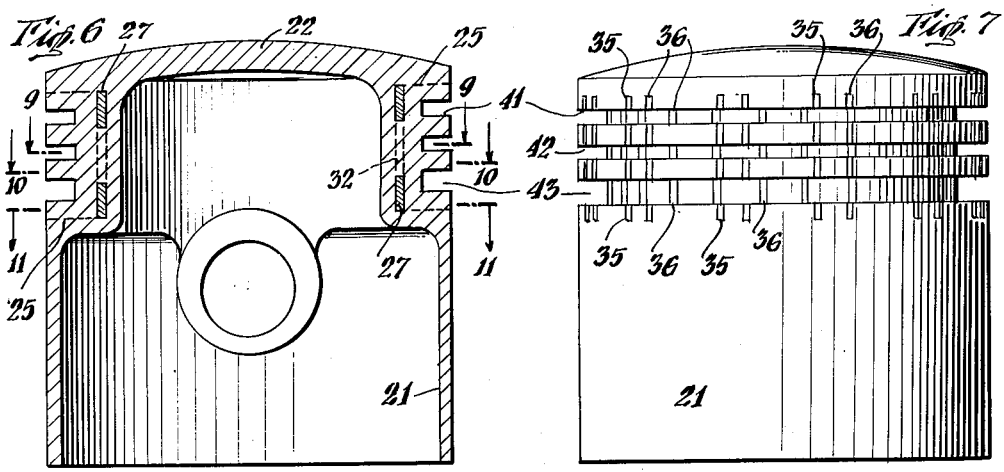
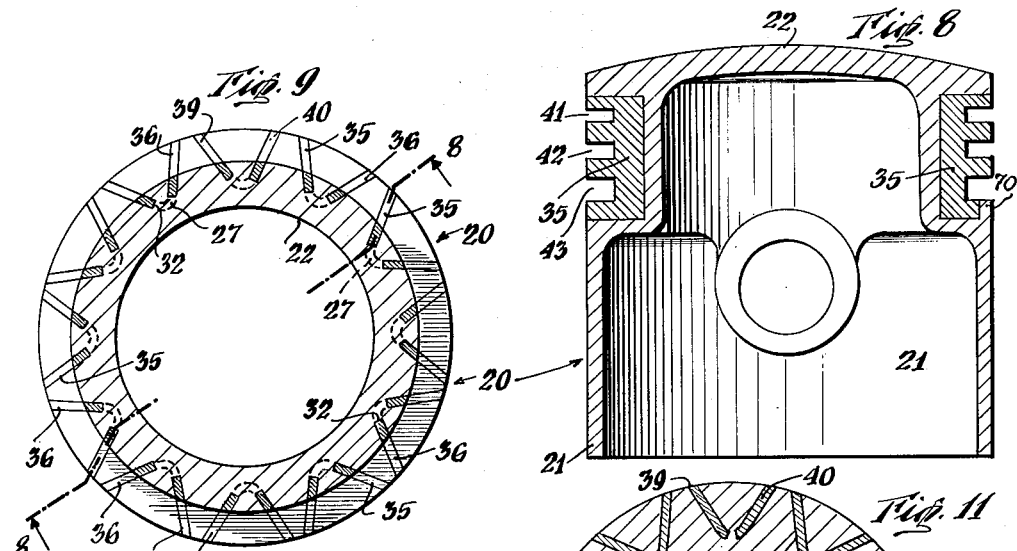
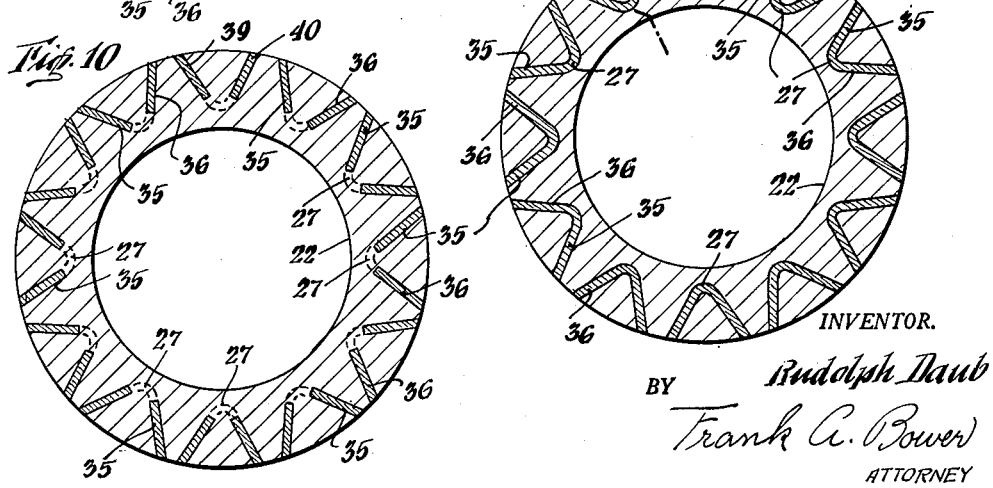

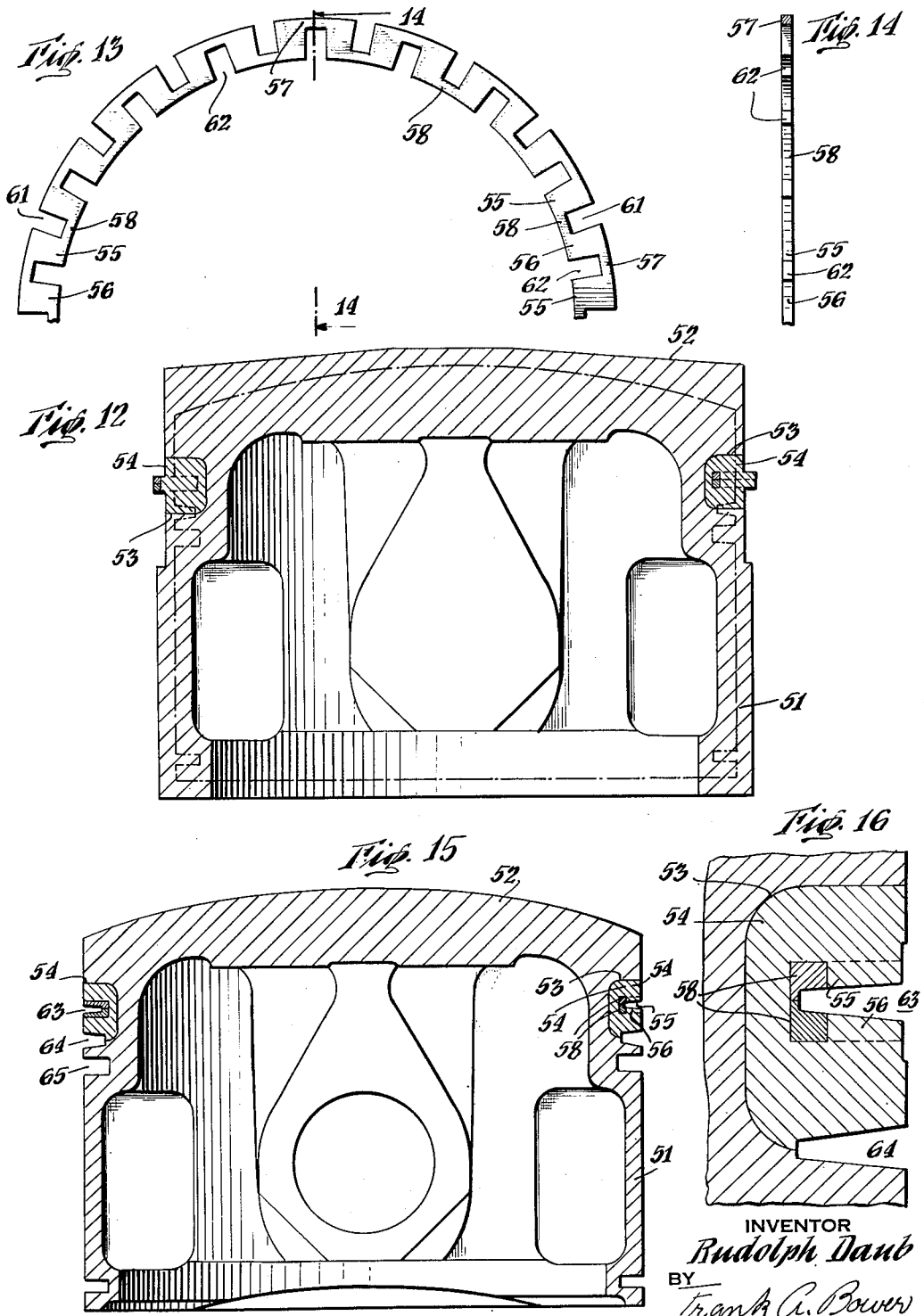

2,760,834

PISTON STRUCTURE

Rudolph Daub, West Caldwell, N. J., assignor of twenty per cent to Frank A. Bower, New York, N. Y.

Application July 28, 1952, Serial No. 301,291

7 Claims. (Cl. 309—14)

This invention relates to pistons of light metal having piston ring groove reinforcements cast in place and presenting hard wearing surfaces to the piston ring.

The object of the invention is to provide these reinforcements in simple practical form securely seated and durable in service.

A further object of the invention is to provide an effective, economical system for assembly of the piston and reinforcements in position for joinder by casting and positioning the parts so that the subsequent grooving will provide the wearing surfaces for contact with the piston ring.

Further objects of the invention particularly in the anchoring of the reinforcements in the lighter metal, and the combination of the reinforced grooving with a forged piston will appear from the following specification taken in connection with the accompanying drawing in which:

Fig. 1 is a cross sectional view taken on line 1—1 of Fig. 2 of a piston cast with reinforcements and ready for the formation of the piston ring grooves (Fig. 6).

Figs. 2 and 3 are cross sectional views taken respectively on lines 2—2 and 3—3 of Fig. 1.

Fig. 4 is a face view of a strip of reinforcement units prior to bending into circular form for assembly in the piston of Fig. 1.

Fig. 5 is a sectional view taken on line 5—5 of Fig. 4.

Fig. 6 is a view similar to Fig. 1 illustrating the formation of the piston grooves.

Fig. 7 is an elevational view of the piston of Fig. 6.

Fig. 8 is a vertical sectional view on line 8—8 of Fig. 9, illustrating the grooving of the reinforcements.

Figs. 9, 10, and 11 are cross sectional views taken respectively on lines 9—9, 10—10 and 11—11 of Fig. 6.

Fig. 12 is a radial sectional view of another form of piston and reinforcement before grooving.

Fig. 13 is a partial view of a strip of reinforcement units bent into circular formation.

Fig. 14 is a radial sectional view taken on line 14—14 of Fig. 13.

Fig. 15 is a view similar to Fig. 12 but showing the formation of the piston ring grooves, and Fig. 16 is a portion of Fig. 15 on enlarged scale showing upper groove formations in detail.

The piston 20 (Figs. 1–11) is of light aluminum alloy and is formed with a skirt 21 and head 22 in which are cast the reinforcing units 25 (Figs. 6 to 11). These units during casting are joined by protruding portions 26 with a circular ridge 23 of the piston alloy between them. In the casting operation the units 25 are all joined together in a unitary circular strip which is set in the mold with the lower protrusions 26 resting on supports positioning the strip to be in place as shown in the final casting.

The strip of reinforcing units 25 is very specially formed (Figs. 4 and 5) from a flat metal band 30 preferably of steel from which there is punched a series of rectangular pieces leaving openings 31 alternating with similar openings 32 between them so that when the strip is corrugated as shown the openings 31 will be at the bends 26 along one side and orifices or openings 32 at the bends 27 along the other side.

This corrugated strip is of a length such that when bent into circular form (Fig. 2) it will fit snugly in the piston mold with portions 26 slightly protruding beyond the normal periphery of the casting as above noted.

Between the openings 31, 32 are the cross bars 35, 36 and from end to end of the strip are the edge bands 37, 38 joined by the cross bars 35, 36 and terminals 39, 40. In circular shape (Fig. 2) in the mold the strip is positioned to have its inner bends 27 imbedded in the metal of the piston head and its outer bends 26 just beyond the periphery. This places the cross bars 35, 36 (Fig. 3) at intervals around the area of the piston ring grooves 41, 42, 43 so that as these are cut the steel of the cross bars will form reinforcing surfacing for the sides and backs of the grooves (Figs. 8 and 9).

The grooving and final finishing thus determine the piston peripheral surface and correspondingly cut the reinforcing units to shape to conform.

In the grooved piston each reinforcing unit 25 comprises grooved cross bars 35, 36 joined by the bend 27 of the band 37 below and of the band 38 above, the bars 36, 36 spreading apart outward. These units are evenly spaced and locked in position in the metal of the piston secure against loosening or displacement.

The surfaces of the reinforcements formed by the grooving engage the piston rings and take up the wear and greatly prolonging the life of the piston by preserving the piston grooves against enlargement and distortion.

A modified form of piston 50 is shown in Figs. 12 to 16 comprising a skirt 51 and head 52 carrying a special groove structure. Fig. 12 shows in full lines a radial section of an aluminum forging forming the body of the piston which at 53 has a deep peripheral channel for a structure adapted to provide a special reinforced upper piston ring groove.

The forged piston blank with the open channel 53 is placed in a mold for casting in the channel of aluminum alloy and circular strips of reinforcing steel inserts are supported in the channel to be partially imbedded in the cast ring 54.

The reinforcing ring structure is shown in partial plan and edge views in Figs. 13 and 14 and comprises a series of cross pieces 55, 56 in alternating sequence joined by outer edge strips 57 and inner edge strips 58, leaving between successive pieces the outer recesses 61 alternating with inner recesses 62. This structure may be fabricated in any desired manner for instance, being blanked out in straight strip form and bent into the circular with open ends so that it will spring over head 52 into place in channel 53. Or it may be in semi-circular halves assembled together in position in the channel.

Preferably two of these reinforcing rings face to face are supported in the channel spaced from the walls thereof as shown (Fig. 12) and with the edge strips 57 protruding beyond the periphery of the forging so that the casting 54 will imbed the inner edge strips 58 and the cross pieces 55, 56 except at the outer ends of the latter where they are joined by the strips 58. The forging then carries the casting 54 and steel reinforcing in the channel 53 and is ready for machining to final form (Figs. 15, 16).

This finishing operation reduces the periphery to approximately the broken line outline indicated in Fig. 12 and as shown in the full line section of Fig. 15, and grooves 63, 64 and 65 are cut for the piston rings (not shown). Preferably, the grooves 63, 64 have their upper and lower surfaces inclined to taper the groove to narrower width toward the center and the cutting of top groove 63 is approximately centered at the surface of contact of the reinforcing rings. In this operation, protruding outer edge strips 57 are removed with small outer portions of the cross pieces 55, 56 and this leaves the individual U-shaped reinforcing units set in the metal of the cast ring 54 with their machined surfaces in contact with the piston ring above and below.

The reinforced piston ring grooves receive the piston rings in usual manner with tolerances provided by accurate machining. The cast-in reinforcing pieces are accurately spaced and positioned and are anchored against release. The conduction of heat from the head to the skirt of the piston is maintained and the ring pressure on the alloy surfaces of the grooves is lessened by the contact of the rings with the steel areas which are relatively unyielding. The result is a great lengthening of the life of the piston at trifling additional cost.

The invention is not intended to be limited to the precise construction shown and described. Various modifications may be resorted to within the scope of the disclosure. For instance, the steel insert strip may be notched at intervals spaced to permit the cast alloy to peripherally retain the corresponding reinforcement as illustrated at 70 in Fig. 8. The number of units will vary with the structure thereof and, as shown in the drawings, there will normally be about twelve or more evenly spaced around the piston ring groove.

The method of manufacture is simple and inexpensive and at the same time, adaptable to a variety of embodiments within the basic concept of translating a metal strip into specially shaped and precisely anchored reinforcing units cast in the lighter metal and subsequently separated by the machining operations providing the usual piston ring grooves.

I claim:

1. A reinforced piston structure comprising a head and a skirt, piston ring grooving in said head, and a series of twelve or more separate reinforcing units cast in the metal at said grooving, each unit consisting of outer, circumferentially separated end portions radially coextensive with said grooving and an inner connecting portion contained within the metal inward of said grooving and anchored therein.

2. A piston structure as set forth in claim 1 in which the outer end portions of each separate reinforcing unit are grooved to be flush with the upper and lower surfaces of the grooving.

3. A piston structure as set forth in claim 1 in which each separate reinforcing unit is set in the metal of the upper part of the grooving.

4. A piston structure as set forth in claim 1 in which each separate reinforcing unit is set in the metal of the lower part of the grooving.

5. A piston structure as set forth in claim 1 in which the separate reinforcing units are paired one above the other in the same grooving.

6. A piston structure as set forth in claim 1 in which the inner connected portions of each of the reinforcing units has an orifice filled with the metal of the casting.

7. A piston structure comprising a forged head and skirt, an annular recess around the periphery of said head, a cast metal annulus in said recess, grooving formed in said cast metal annulus, and a series of reinforcing units set in the said cast metal, each unit consisting of outer portions spaced apart at said grooving and inner connected portions imbedded in the metal of the said annulus.

References Cited in the file of this patent

UNITED STATES PATENTS

| 2,124,360 | Welty | July 19, 1938 |
| 2,301,944 | Giberti | Nov. 17, 1942 |
| 2,550,879 | Stevens | May 1, 1951 |

FOREIGN PATENTS

| 455,539 | France | Dec. 13, 1913 |
| 897,373 | France | Mar. 20, 1945 |
| 251,127 | Great Britain | Apr. 29, 1926 |
| 540,990 | Great Britain | Nov. 7, 1941 |
| 557,070 | Great Britain | Nov. 3, 1943 |
| 581,527 | Great Britain | Oct. 16, 1946 |
| 642,042 | Great Britain | Aug. 23, 1950 |

OTHER REFERENCES

Publication in Automotive Industries, vol. 105, issue No. 9, Nov. 1, 1951, inside back cover.